A. A. H. TISSERANT.
MOTOR ROAD VEHICLE.
APPLICATION FILED MAR. 4, 1919.
1,310,972.
Patented July 22, 1919.
3 SHEETS—SHEET 1.
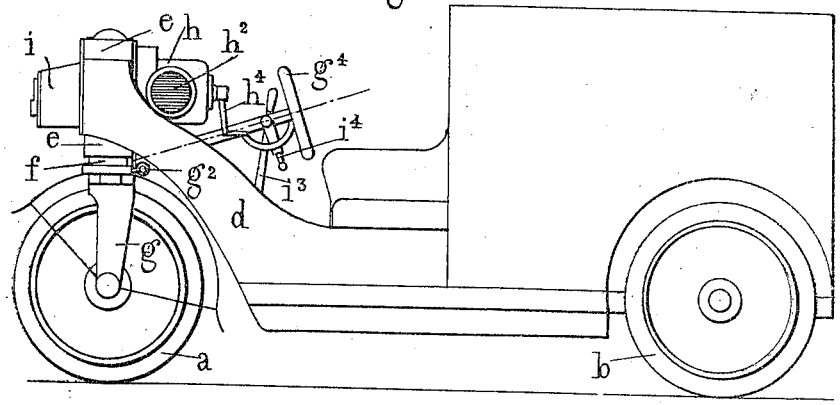
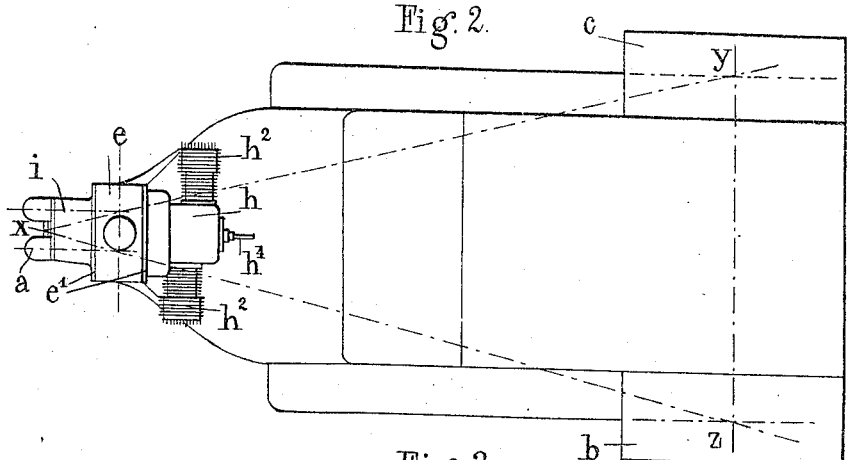
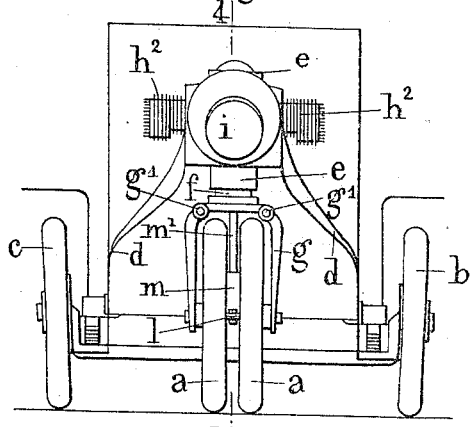
INVENTOR
AUGUSTE A.H. TISSERANT
BY Horrow and Horrow
ATTORNEYS

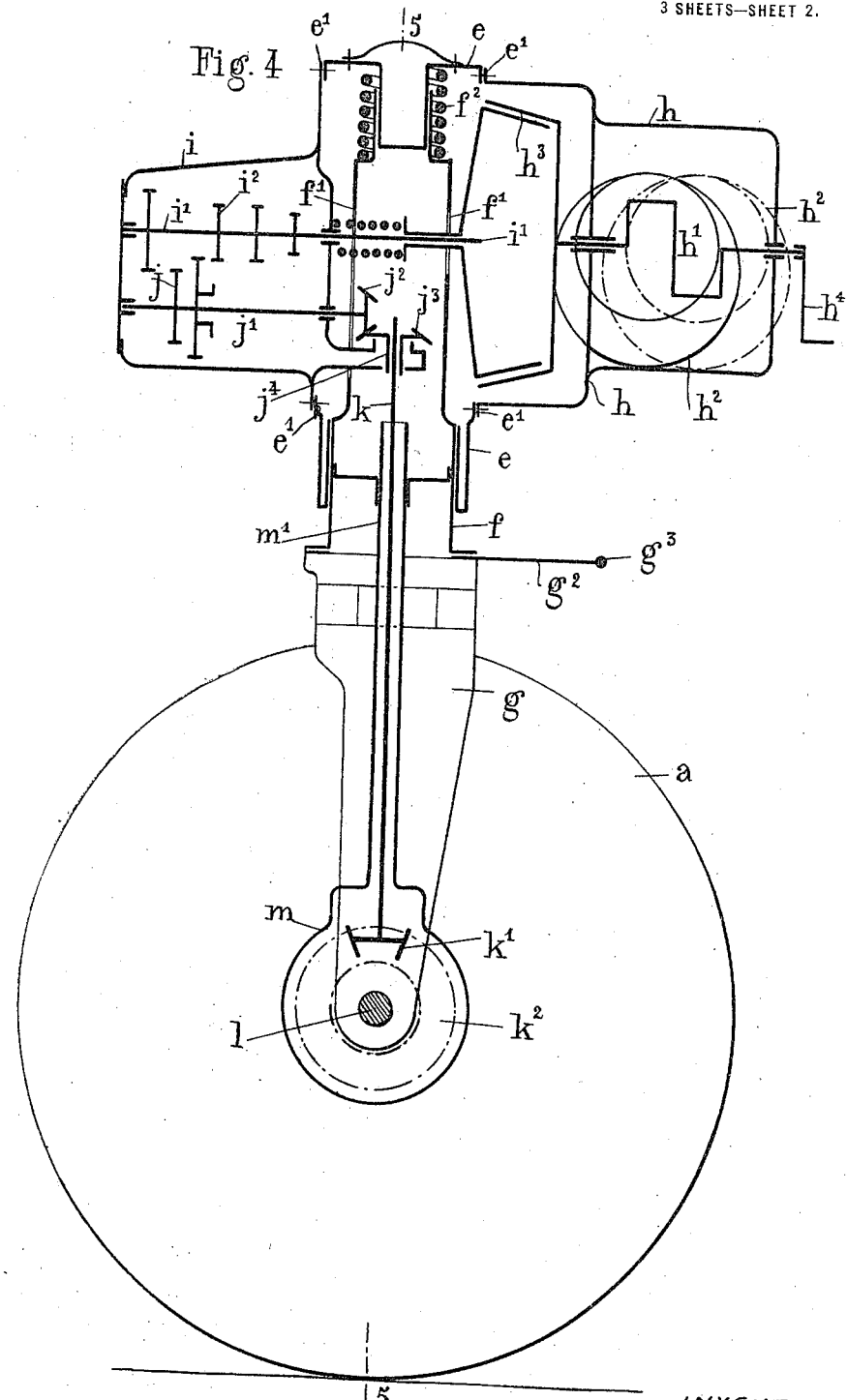

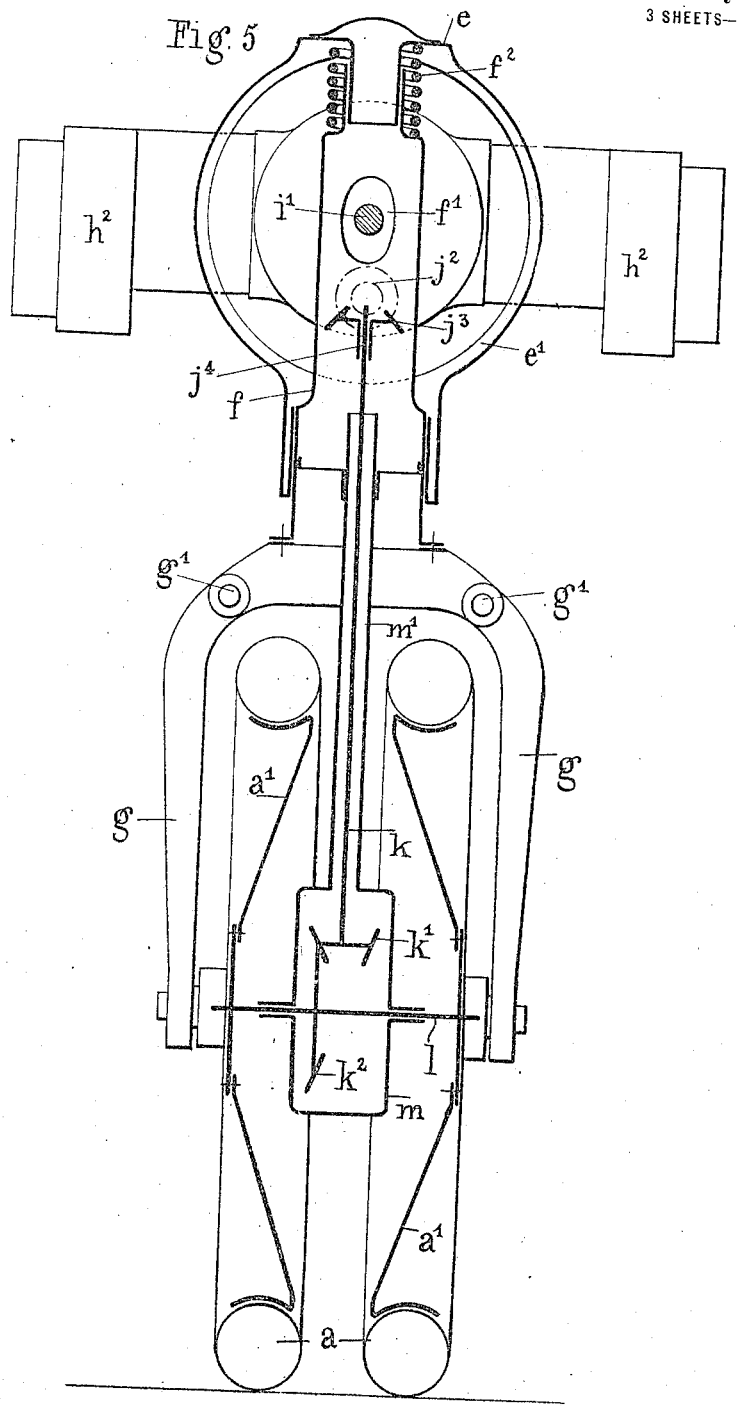

UNITED STATES PATENT OFFICE.

AUGUSTE ALBERT HONORÉ TISSERANT, OF ST. CLOUD, FRANCE.

MOTOR ROAD-VEHICLE.

1,310,972.  Specification of Letters Patent.  Patented July 22, 1919.

Application filed March 4, 1919. Serial No. 280,552.

*To all whom it may concern:*

Be it known that I, AUGUSTE ALBERT HONORÉ TISSERANT, a citizen of the Republic of France, and a resident of Villa Thélia, Avenue des Coteaux, St. Cloud, Seine et Oise, France, have invented new and useful Improvements in Motor Road-Vehicles, of which the following is a specification.

This invention relates to a motor road vehicle having a front driving and steering wheel and rear wheels which carry the load. The fork of the front wheel is fixed to a hollow piece forming a steering pivot and adapted to slide elastically in the vertical direction and to be turned in any desired direction by rotation on its vertical axis, this hollow piece being within another hollow piece constituted by an extension of the front part of the chassis. On this latter hollow piece the motor and the speed gear box are removably mounted so as to be symmetrically placed with reference to the said axis, the front wheel being duplicated in such manner as to allow of the reducing shaft, driving the axle of the wheel, to pass between the two parts of the wheel and along the axis of the steering pivot.

The accompanying drawings show by way of example a construction in accordance with the invention.

Figure 1 is a side elevation of the motor-car.

Fig. 2 is a plan.

Fig. 3 is a front elevation.

Fig. 4 is a vertical longitudinal section drawn to an enlarged scale on line 4—4 of Fig. 3.

Fig. 5 is a vertical section in a plane at right angles to that of Fig. 4, that is to say on the line 5—5 of Fig. 4.

The motorcar comprises a double front driving and steering wheel $a$, $a$ and two rear carrying wheels $b$, $c$. These three wheels are connected with the chassis $d$ by means of springs. The front part of the chassis is constituted by a hollow piece $e$ preferably of steel, in which can slide and turn a piece of tubular form $f$ which is the steering pivot and is assembled with and fixed to the fork $g$ of the front wheel $a$ $a$. The hollow piece $e$ has two large annular flanges $e^1$, $e^1$, diametrically opposite to each other and in planes at right angles to the longitudinal axis of the chassis. On one of these flanges is mounted a casing $h$ carrying the motor and inclosing the crank shaft $h^1$. On the other flange is mounted a speed gear box $i$. This arrangement permits easy and rapid dismounting and also complete removal and exchange of the motor and of the speed gear box.

The motor has two opposite horizontal cylinders $h^2$, $h^2$ with fins for air-cooling. The motor shaft $h^1$ drives through a clutch $h^3$ a transmission shaft $i^1$ carrying gear wheels $i^2$ adapted to be engaged with one or another of the gear wheels $j$ mounted on a counter transmission shaft $j^1$. The steering pivot $f$ has elongated openings $f^1$ of oval form through which extend the transmission shafts $i^1$ and $j^1$ of the speed gear box $i$. These openings $f^1$ allow the steering pivot $f$ to take, in relation to the piece $e$ fixed to the chassis $d$, the maxima angular positions necessary for steering the vehicle without touching the shafts $i^1$, $j^1$.

The shaft $j^1$ carries at its end a bevel gear wheel $j^2$ engaged with a like wheel $j^3$ mounted free, coaxially with the vertical axis of the steering pivot $f$, on an extension of the speed gear box $i$. Through the nave $j^4$ of this wheel $j^3$ extends a shaft $k$ coaxial with the vertical axis of the pivot $f$ and grooved to receive keys in the nave $j^4$, so that the shaft $k$ may be driven by the transmission shaft $j^1$, notwithstanding that the shaft $k$ may move vertically at the same time that the steering pivot $f$ slides vertically within the piece $e$ fixed to the chassis, owing to irregularities in the ground on which the front wheel is running. A helical spring $f^2$ forms an elastic connection between the front wheel and the chassis.

The shaft $k$ drives through a second bevel reducing gear $k^1$, $k^2$ to the axle $l$ of the front wheel mounted in the two arms of the fork $g$. The shaft $k$ extends through a vertical tubular extension $m'$ of the casing $m$ inclosing the reducing gear $k^1$, $k^2$ of the axle $l$ and adapted to turn on this latter.

It will be seen that the driving and steering wheel is controlled without the intermediary of any universal joint.

The upper end of the tubular extension $m^1$ is assembled with the upper part of the steering pivot. It follows that the whole of the casing $m$ and its tubular extension $m^1$ receives the reactions of the reducing gear $k^1$, $k^2$ and transmits them directly to the tubular steering pivot $f$ without passing through the two arms of the fork.

The front wheel is duplicated, the casing $m$ of the reducing gear $k^1$, $k^2$ being placed between the two parts $a\ a$ of this wheel. The spokes $a^1$ of the two parts of the wheel are preferably displaced laterally outward as indicated in Fig. 5, so that the two parts $a\ a$ may be brought close to one another notwithstanding that the casing $m$ is accommodated between them, so that the bulk of the wheel is reduced. It suffices to leave between the two parts $a\ a$ of the wheel a space sufficient to allow the passage, with a certain degree of play, of the vertical tube $m^1$ along the vertical axis about which the steering fork turns. The double front wheel imparts stability to the vehicle on account of the lengthening toward the front of the supporting triangle $x$—$y$—$z$, Fig. 2: at the same time it secures a better distribution of the adhesive force of the motor.

The two arms of the fork $g$ are preferably jointed at $g^1$ near the head of the fork so as to allow the fork to be opened laterally to facilitate mounting and dismounting the two parts $a\ a$ of the front wheel.

The vehicle is steered in the following manner:

The head of the fork $g$ carries an arm $g^2$ ending in a ball $g^3$ (Fig. 4), and this arm is connected by a connecting rod with a steering mechanism fixed to the chassis and controlled by a steering wheel $g^4$, Fig. 1. This steering mechanism may be placed either to the right or to the left of the longitudinal axis of the vehicle accordingly as it is desired that the driver shall sit on the right hand or on the left hand.

The vehicle preferably has two brakes acting on the rear wheels respectively. One of these brakes is controlled by a pedal placed under the right foot of the driver and the other is operated by a hand lever $i^3$ placed either to the right hand or to the left hand of the driver according to his position.

The clutch is controlled by a pedal under the left foot of the driver. The change of speed is controlled by a lever $i^4$ operating on a toothed sector fixed to the post of the steering wheel $g^4$. The vehicle is started by means of a crank $h^4$ conveniently placed to be operated by the driver without descending from his seat, this being rendered possible by the position of the motor.

Having now particularly described and ascertained the nature of my said invention and in what manner the same is to be performed, I declare that what I claim is:

1. A motor road vehicle, comprising a front driving and steering wheel and two rear carrying wheels, wherein the fork of the front wheel is fixed to a hollow piece forming a steering pivot and adapted to slide elastically in a vertical direction and to be turned in any desired direction on its vertical axis, this hollow piece being contained within a second hollow piece constituted by an extension of the front part of the chassis, the motor and the speed gear box being mounted on this second hollow piece symmetrically with reference to the said vertical axis, and wherein the front wheel is a double wheel so constructed that between its two parts there can pass coaxially with the steering pivot a reducing shaft driving the axle of the double wheel without the invention of any universal joint.

2. The construction of the driving wheel referred to in claim 1, in which the speed gear box and the motor are assembled on the hollow piece which incloses the steering pivot by means of flanges which permit easy and rapid dismounting of the box and motor and so that these parts can be completely removed and exchanged.

3. The construction of the driving wheel referred to in claim 1, wherein the motor comprises two opposite horizontal cylinders cooled by air.

In testimony whereof I have signed my name to this specification.

AUGUSTE ALBERT HONORÉ TISSERANT.

Witnesses:
  JOHN F. SIMONS,
  W. DEFÉVRIMONT.